US008184176B2

(12) United States Patent
Sharma

(10) Patent No.: US 8,184,176 B2
(45) Date of Patent: May 22, 2012

(54) DIGITAL CAMERA BLENDING AND CLASHING COLOR WARNING SYSTEM

(75) Inventor: Sanjeev Sharma, Ashburn, VA (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/633,856

(22) Filed: Dec. 9, 2009

(65) Prior Publication Data

US 2011/0134261 A1 Jun. 9, 2011

(51) Int. Cl.
*H04N 5/228* (2006.01)
(52) U.S. Cl. .................................... 348/222.1
(58) Field of Classification Search ............... 348/222.1
See application file for complete search history.

(56) References Cited

U.S. PATENT DOCUMENTS

| 7,559,472 | B2 | 7/2009 | Silverbrook et al. | |
|---|---|---|---|---|
| 2002/0044152 | A1* | 4/2002 | Abbott et al. | 345/629 |
| 2002/0051155 | A1* | 5/2002 | Fujioka et al. | 358/1.9 |
| 2004/0119851 | A1 | 6/2004 | Kaku | |
| 2004/0150850 | A1 | 8/2004 | Hanamoto | |
| 2005/0134879 | A1 | 6/2005 | Fuchs et al. | |
| 2005/0174473 | A1 | 8/2005 | Morgan et al. | |
| 2005/0179781 | A1 | 8/2005 | Silverbrook | |
| 2006/0139669 | A1 | 6/2006 | Takahashi | |
| 2007/0297691 | A1 | 12/2007 | Reid | |
| 2008/0062443 | A1 | 3/2008 | Olson | |
| 2009/0022417 | A1 | 1/2009 | Reid | |

OTHER PUBLICATIONS

Karadkar et al., "Exploring User Perceptions of Digital Image Similarity", JCDL '05, Jun. 7-11, 2005, IEEE Xplore, pp. 89-90.

* cited by examiner

*Primary Examiner* — James Hannett
(74) *Attorney, Agent, or Firm* — Hoffman Warnick LLC; Douglas A. Lashmit

(57) ABSTRACT

A system, method and program product for detecting and warning of problematic color combinations. A system is disclosed that includes a color warning system having: a scanning system for detecting proximately located objects appearing in an electronic view finder of the digital camera; a color identification system for quantifying a color of each of the proximately located objects; an analysis system for identifying a problematic color combination in the proximately located objects; and a warning system for outputting a warning prior to a picture capture operation upon a detection of the problematic color combination.

20 Claims, 3 Drawing Sheets

DIGITAL CAMERA BLENDING AND CLASHING COLOR WARNING SYSTEM

FIELD OF THE INVENTION

This disclosure is related generally to digital cameras, and more particularly to a system and method that warns digital camera operators of potential color blending and/or color clashing.

BACKGROUND OF THE INVENTION

Digital photographs taken by a typical photographer often result in objects in the picture blending in with other objects or the background. This effect, referred to as "color blending," occurs when two objects having similar colors are in close proximity to each other or are in front of each other. The end result is a photograph that is less than pleasing to the eye.

Another such problem may occur when two objects with clashing colors are in close proximity to or in front of each other in the photograph. This effect, referred to as "color clashing," likewise results in photographs that are not pleasing to the eye.

SUMMARY OF THE INVENTION

The present invention relates to a system, method and program product for generating a warning within the user interface of a digital camera that color clashing or blending has been detected, prior to the image being captured as a digital photograph. This thus allows the photographer to reframe the picture by, e.g., moving objects that are causing the problem or by changing the perspective of the camera, in order to resolve the problem.

In one embodiment, there is a digital camera having a color warning system, comprising: a scanning system for detecting proximately located objects appearing in an electronic view finder of the digital camera; a color identification system for quantifying a color of each of the proximately located objects; an analysis system for identifying a problematic color combination in the proximately located objects; and a warning system for outputting a warning prior to a picture capture operation upon a detection of the problematic color combination.

In a second embodiment, there is a method for warning of problematic color combinations in a digital camera, comprising: detecting proximately located objects appearing in an electronic view finder of the digital camera; quantifying a color of each of the proximately located objects; identifying a problematic color combination in the proximately located objects; and outputting a warning prior to a picture capture operation upon a detection of the problematic color combination.

In a third embodiment, there is a computer readable storage medium having a program product stored thereon for warning of problematic color combinations in a digital camera, comprising: program code that detects proximately located objects appearing in an electronic view finder of the digital camera; program code that quantifies a color of each of the proximately located objects; program code that identifies a problematic color combination in the proximately located objects; and program code that outputs a warning prior to a picture capture operation upon a detection of the problematic color combination.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
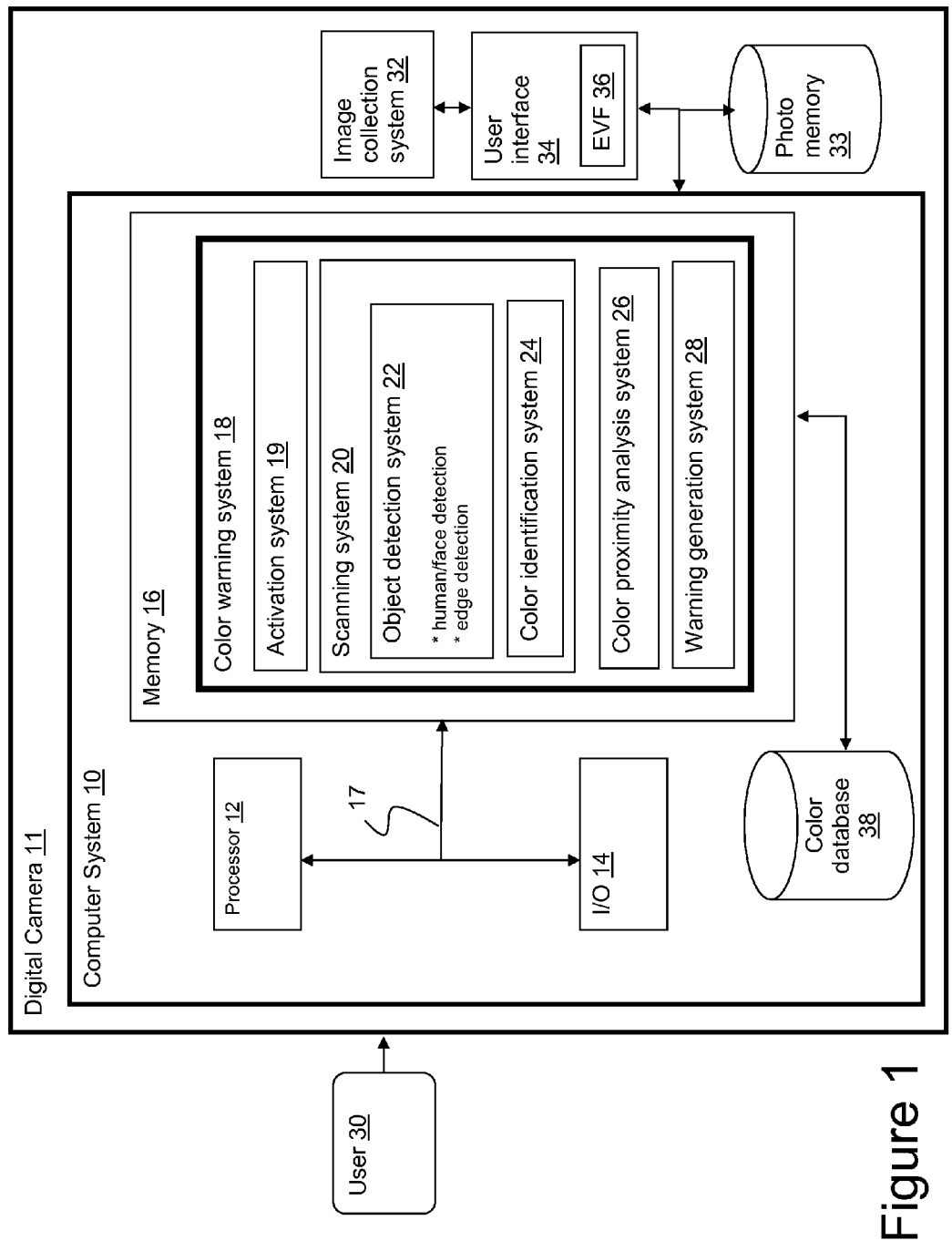
FIG. 1 depicts a digital camera having a color warning system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, a block diagram representing a digital camera 11 is shown. Digital camera 11 may generally include any number of features commonly found on such current art devices, including those incorporated into phones and other hand held devices. Among such features is an image collection system 32, e.g., a lens/electronic sensor for converting physical image data into electronic image data (i.e., an "image"). Also included is a user interface 34, which generally comprises an electronic view finder (EVF) 36 that provides a live preview for displaying real time electronic image data. The EVF 36 allows the user to view and "frame" a picture prior to actually taking the picture. User interface 34 may also include other features such as touch screen capabilities, a picture capture button, informational displays, manual buttons and controls, zooming features, autofocus, menu selections, etc. In general, operation of the digital camera 11 involves a user 30 pointing the digital camera lens at some physical image data, which then appears as a live preview on the electronic view finder 36. When the image is framed in an acceptable manner, the user 30 snaps the picture by depressing a picture capture button, which stores an electronic image of the picture in photo memory 33.

As noted, color blending and color clashing are two common problems that detract from picture quality. To address this, digital camera 11 includes a computer system 10 having a color warning system 18 for generating a warning when a potentially problematic color combination exists among proximately located objects being displayed in the electronic view finder 36. This thus allows user 30 to reframe the picture before it is taken, i.e., captured to photo memory 33.

Color warning system 18 includes an activation system 19 for activating problem detection. Activation system 19 may utilized any mechanism or process. In one illustrative embodiment, activation may be accomplished by simply pressing the picture capture button on the digital camera 11. If color clashing or blending is detected, then the picture capture operation can be interrupted or prevented, and a warning can be generated. In an alternative embodiment, activation may be accomplished by partially depressing the picture capture button, e.g., halfway, or by providing some other mechanism to press, set or enable.

In still a further embodiment, color warning system 18 may be activated to function continuously, i.e., in a dynamic fashion during live preview, rather than on-demand. In a continuous mode, warnings would appear and disappear in the electronic view finder 36 as the images in the live preview change. In the on-demand modes described above, warnings and highlighting only appear when the color warning system 18 is activated by pressing a button or the like. Accordingly, color warning system 18 may be implemented to allow the user 30 to select a continuous mode or an on-demand mode.

Regardless of the mode, once activated, scanning system 20 scans and processes the electronic image data in the electronic view finder 36. Incorporated into scanning system 20 are an object detection system 22 and a color identification system 24. Object detection system 22 may utilize any now known or later developed process for detecting objects in an electronic image. One technique involves face detection, which is currently utilized in several commercially available digital cameras. Once a human face is detected, object detection system 22 can then locate associated objects (e.g., using edge detection), such as the clothes worn by the human, skin, hair, eyes, accessories, etc. Although the embodiments described herein are directed to identifying objects associated with humans, it is understood that the invention applies to the detection and analysis of any types of objects.

Color identification system 24 identifies and quantifies the color of each of the detected objects. Colors may be quantified and stored in any format, e.g., as coded binary numbers, a vector, etc.

Once a primary set of objects are detected (such as a human and its associated objects), object detection system 22 can scan the image for secondary objects proximately located to the primary set of objects, e.g., other humans, landscapes, automobiles, houses, etc. Note that "proximately located" may include objects located within a predetermined distance of each other, objects that overlap each other, etc. Color identification system 24 also identifies and quantifies the color of each of the secondary objects.

Once the primary and secondary objects in the frame are processed, color proximity analysis system 26 determines whether a problematic color combination exists among proximately located objects, i.e., blending and/or clashing. If clashing or blending is detected, warning generation system 28 generates a warning via the user interface 34, which may include highlighting the offending objects in the electronic view finder 36, outputting a message, generating an audio warning, vibrating, etc. The user 30 would then have the opportunity to reframe the picture, e.g., change the arrangement of objects in the photograph (if possible), move the digital camera 11, change the zoom, etc., to prevent the photograph from having blended or clashing colors.

Color proximity analysis system 26 may utilize a color database 38 that has color combinations stored that have been pre-categorized as blending or clashing. Once the colors of two proximately located objects are determined, they can be compared to the color database 38 to see if the combination is categorized as blending or clashing. Alternatively, color proximity analysis system 26 could dynamically measure a "color distance" between the colors of two proximately located objects to dynamically determine if clashing or blending exists. If the color distance was less than a first threshold, this would indicate blending, and if the color distance was greater than a second threshold, this would indicate clashing. For instance, a first color may have a value 314 and a second color may have a value of 320. Assuming a first threshold of 10, these two colors would be identified as blending because their color distance is less than 10, i.e., six.

Blending may for example be dictated based on "human color perception" or "just noticeable difference" techniques. Color vision is the capacity to distinguish objects based on the wavelengths (or frequencies) of the light they reflect or emit. The nervous system of a human derives color by comparing the responses to light from the several types of cone photoreceptors in the eye. These cone photoreceptors are sensitive to different portions of the visible spectrum. For humans, the visible spectrum ranges approximately from 380 to 740 nm, and there are normally three types of cones.

Color blending may be analyzed by comparing different colors within a mathematical color space. If the colors of adjacent objects are too close based on some predefined threshold, then one may conclude that color blending exists. For instance, a "physical color" is a combination of pure spectral colors (in the visible range). Since there are, in principle, infinitely many distinct spectral colors, the set of all physical colors may be thought of as an infinite-dimensional vector space, in fact a Hilbert space $H_{color}$. More technically, the space of physical colors may be considered to be the (mathematical) cone over the simplex whose vertices are the spectral colors, with white at the centroid of the simplex, black at the apex of the cone, and the monochromatic color associated with any given vertex somewhere along the line from that vertex to the apex depending on its brightness.

An element C of $H_{color}$ is a function from the range of visible wavelengths—considered as an interval of real numbers $[W_{min}, W_{max}]$—to the real numbers, assigning to each wavelength w in $[W_{min}, W_{max}]$ its intensity C(w). A humanly perceived color may be modeled as three numbers: the extents to which each of the 3 types of cones is stimulated. Thus a humanly perceived color may be thought of as a point in 3-dimensional Euclidean space $R^3_{color}$. Since each wavelength w stimulates each of the 3 types of cone cells to a known extent, these extents may be represented by 3 functions s(w), m(w), l(w) corresponding to the response of the S, M, and L cone cells, respectively. Using this approach, detected colors may be mapped to such a spaced and compared to determine if blending exists.

Clashing colors may be identified based on Color Theory principles. For example, complementary colors may be identified as clashing, whereas analogous colors (i.e., adjacent colors on the color wheel) may be identified as pleasing or harmonious.

Referring again to FIG. 1, any technique for identifying and/or storing problematic color combinations may be utilized. In a further embodiment, a utility could be implemented by color warning system 18 that interrogates the user 30 during a set up mode to identify pleasing or unpleasing color combinations. The results of the interrogation could then be used to build out color database 38 or be used as a basis for identifying clashing and/or blending colors.

Figure 2:
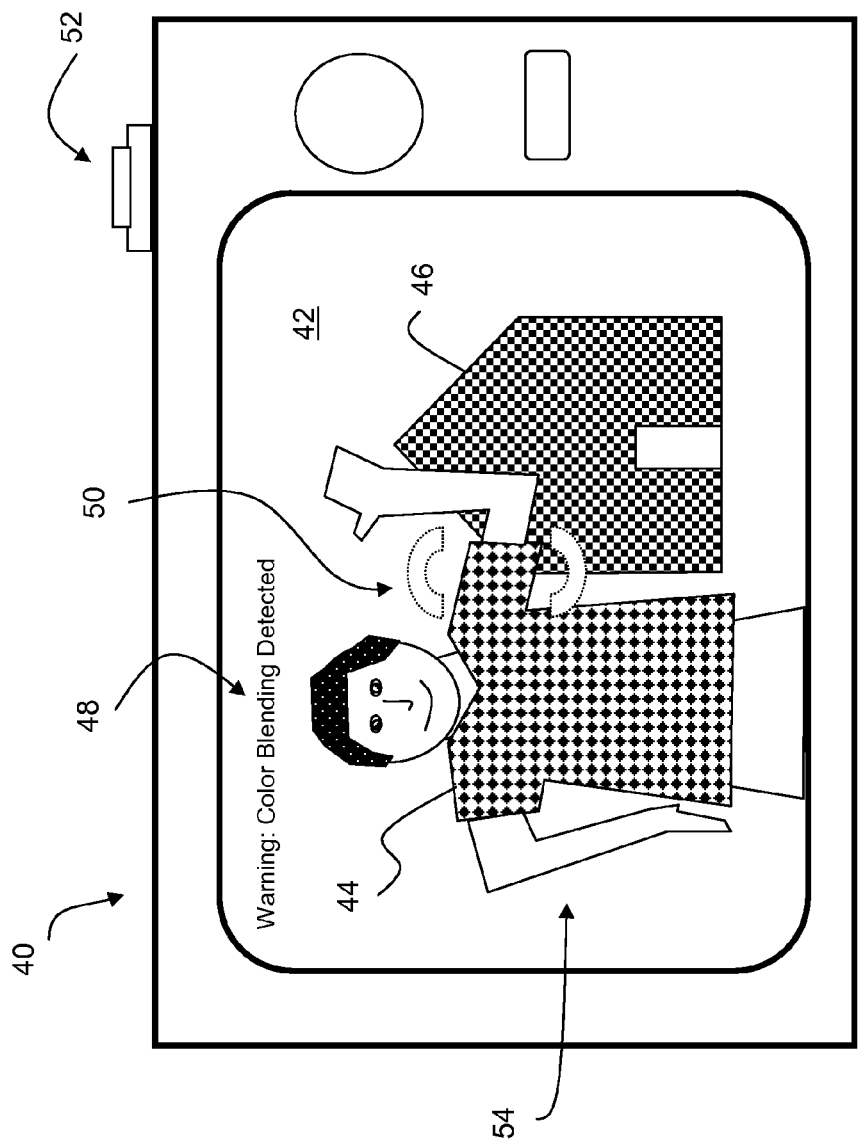
FIG. 2 depicts a digital camera electronic view finder in accordance with an embodiment of the invention.

Referring to FIG. 2, a rear view of a digital camera 40 is shown with an electronic view finder 42. In this example, an image of a human 54 is displayed in front of a house 46. In this illustrative embodiment, color warning system 18 (FIG. 1) is activated by partially depressing the picture capture button 52. When button 52 is partially depressed, the image appearing in the electronic view finder 42 is analyzed for color clashing or blending. In the depicted image, the color of the human's shirt 44 is detected as blending with the color of the house 46. In this embodiment, warning display system 28 (FIG. 1) displays a written warning 48 "Warning: Color Blending Detected" and a visual warning 50, i.e., a pair of semi-circles that highlight where the color blending is occurring.

Accordingly, prior to taking the picture, the user can reframe the picture, e.g., by moving the human 54 away from the house, to eliminate color blending. Alternatively, the user may simply ignore/override the warning by fully depressing the picture capture button 52. It is understood that the warnings shown here are for illustrative purposes only, and that other types of warnings may be utilized, e.g., blinking lights, audio, vibration, animation, etc.

Figure 3:
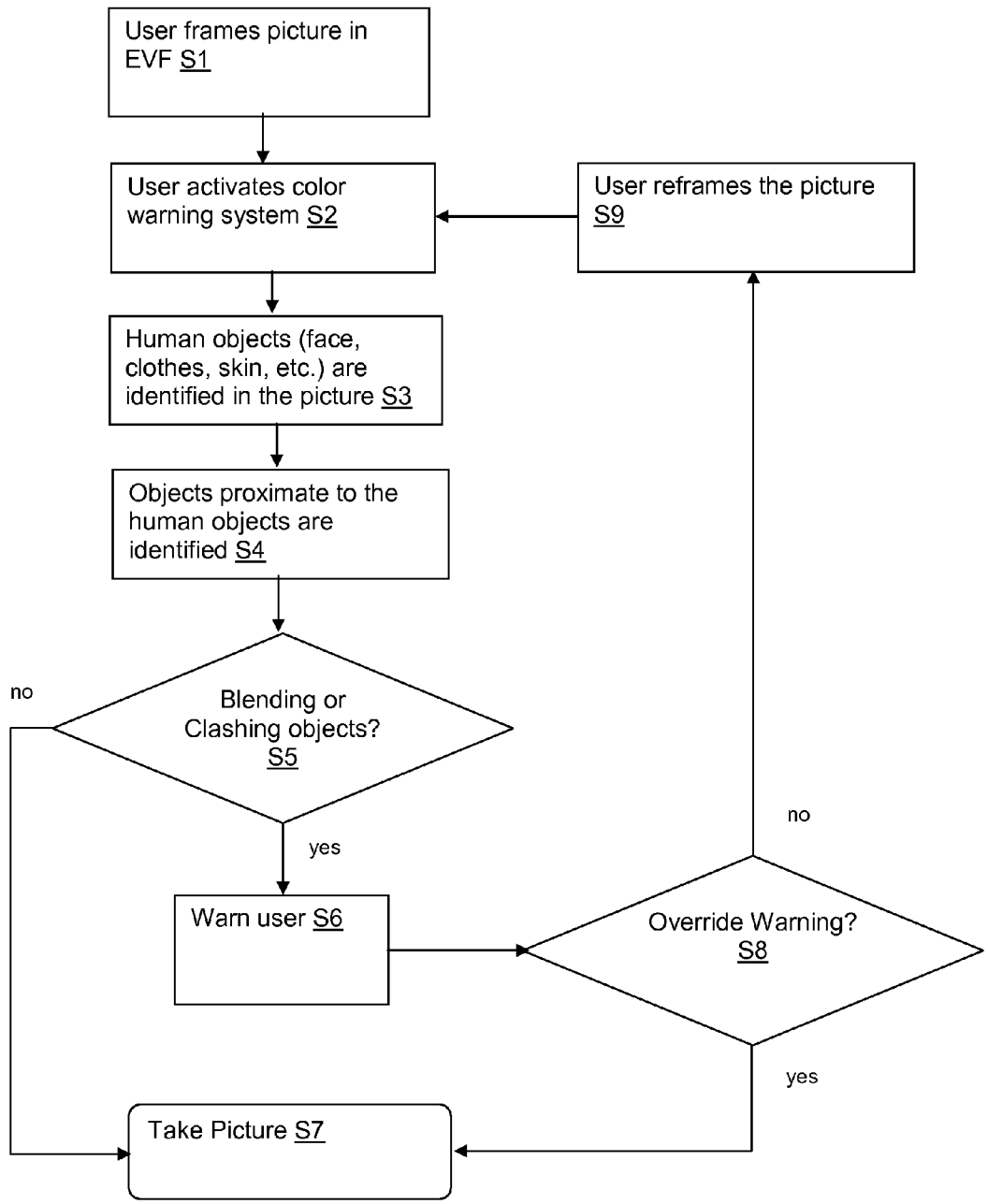
FIG. 3 depicts a flow chart of a method in accordance with an embodiment of the invention.

Referring now to FIG. 3, a flow diagram showing a method in accordance with an embodiment is depicted. At S1, the user frames the picture in the electronic view finder (EVF), and at S2 the user activates the color warning system. At S3, human objects, i.e., face, clothes, skin, etc., are indentified in the picture. At S4, objects located proximate the human objects are also identified. At S5, a determination is made whether blending or clashing objects exist between the human objects and the proximately located objects. If no, the picture can be taken at S7. If yes, a warning is issued to the user at S6. At S8, the user is given the opportunity to override the warning, e.g., fully depressing a button, double clicking a button, holding a button down for an extended period of time (e.g., 3 seconds), etc. If overridden, the picture is taken at S7. If the user does not want to override the warning at S8, then the user reframes the picture at S9 and repeats the process from S2.

Referring again to FIG. 1, it is understood that color warning system 18 may be implemented using any type of computing device (i.e., computer system). Such a computing device generally includes a processor 12, input/output (I/O 14), memory 16, and bus 17. The processor 12 may comprise a single processing unit, or be distributed across one or more processing units. Memory 16 may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a color warning system 18 could be created, maintained and/or deployed by a service provider that offers the functions described herein for customers. That is, a service provider could offer to deploy or provide the ability evaluate objects and their colors as described above.

It is understood that in addition to being implemented as a system and method, the features may be provided as one or more program products stored on a computer-readable storage medium, which when run, enables a computer system to provide a color warning system 18. To this extent, the computer-readable storage medium may include program code, which implements the processes and systems described herein. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component", "subsystem" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A digital camera having a color warning system, comprising:
a scanning system for detecting proximately located objects appearing in an electronic view finder of the digital camera;
a color identification system for quantifying a color of each of the proximately located objects;

an analysis system for identifying a problematic color combination in the proximately located objects; and a warning system for outputting a warning prior to a picture capture operation upon a detection of the problematic color combination.

2. The digital camera of claim 1, wherein the problematic color combination comprises color clashing.

3. The digital camera of claim 1, wherein the problematic color combination comprises color blending.

4. The digital camera of claim 1, further comprising a system for activating the color warning system.

5. The digital camera of claim 1, wherein the scanning system detects a primary set of objects associated with a human image and a secondary set of objects proximately located to the primary set of objects.

6. The digital camera of claim 1, further comprising a color database for storing color combinations that are either color clashing or color blending.

7. The digital camera of claim 1, wherein the warning comprises highlighting of a problem area in the electronic view finder.

8. A method for warning of problematic color combinations in a digital camera, comprising:

detecting proximately located objects appearing in an electronic view finder of the digital camera;

quantifying a color of each of the proximately located objects;

identifying a problematic color combination in the proximately located objects; and outputting a warning prior to a picture capture operation upon a detection of the problematic color combination.

9. The method of claim 8, wherein the problematic color combination comprises color clashing.

10. The method of claim 8, wherein the problematic color combination comprises color blending.

11. The method of claim 8, wherein the detecting detects a primary set of objects associated with a human image and a secondary set of objects proximately located to the primary set of objects.

12. The method of claim 8, wherein the identifying includes utilizing a color database of color combinations that are either color clashing or color blending.

13. The method of claim 8, wherein the warning comprises a highlight of a problem area in the electronic view finder.

14. A computer readable storage medium having a program product stored thereon for warning of problematic color combinations in a digital camera, comprising:

program code that detects proximately located objects appearing in an electronic view finder of the digital camera;

program code that quantifies a color of each of the proximately located objects;

program code that identifies a problematic color combination in the proximately located objects; and program code that outputs a warning prior to a picture capture operation upon a detection of the problematic color combination.

15. The computer readable storage medium of claim 14, wherein the problematic color combination comprises color clashing.

16. The computer readable storage medium of claim 14, wherein the problematic color combination comprises color blending.

17. The computer readable storage medium of claim 14, wherein the program code for detecting detects a primary set of objects associated with a human image and a secondary set of objects proximately located to the primary set of objects.

18. The computer readable storage medium of claim 14, wherein the program code for identifying includes utilizing a color database of color combinations that are either color clashing or color blending.

19. The computer readable storage medium of claim 14, wherein the warning comprises a highlight of a problem area in the electronic view finder.

20. The computer readable storage medium of claim 14, further comprising program code for activating the identification of problematic color combinations.

* * * * *